(12) United States Patent
Long et al.

(10) Patent No.: US 12,420,361 B2
(45) Date of Patent: Sep. 23, 2025

(54) BRAZE COATING MATERIAL WITH NICKEL CORE AND COATING AND PREPARATION METHOD AND BRAZE COATING METHOD THEREOF

(71) Applicant: ZHENGZHOU RESEARCH INSTITUTE OF MECHANICAL ENGINEERING CO., LTD., Henan (CN)

(72) Inventors: Weimin Long, Henan (CN); Guanxing Zhang, Henan (CN); Yong Li, Henan (CN); Yongtao Jiu, Henan (CN); Yinyin Pei, Henan (CN); Junlan Huang, Henan (CN); Hongwei Dong, Henan (CN); Hangyan Xue, Henan (CN)

(73) Assignee: ZHENGZHOU RESEARCH INSTITUTE OF MECHANICAL ENGINEERING CO., LTD., Henan (CN)

(*) Notice: Subject to any disclaimer, the term of this patent is extended or adjusted under 35 U.S.C. 154(b) by 478 days.

(21) Appl. No.: 18/169,204

(22) Filed: Feb. 14, 2023

(65) Prior Publication Data
US 2023/0398645 A1    Dec. 14, 2023

(30) Foreign Application Priority Data
Jun. 10, 2022    (CN) .................. 202210656011.X

(51) Int. Cl.
*B23K 35/365*    (2006.01)
*B23K 35/30*    (2006.01)
(Continued)

(52) U.S. Cl.
CPC ........ *B23K 35/365* (2013.01); *B23K 35/3033* (2013.01); *B23K 35/3601* (2013.01);
(Continued)

(58) Field of Classification Search
CPC .............. B23K 35/365; B23K 35/3033; B23K 35/3601; B23K 35/3602; B23K 35/3607;
(Continued)

(56) References Cited

U.S. PATENT DOCUMENTS 3,084,074 A * 4/1963 Wasserman .......... B23K 35/365
428/386

OTHER PUBLICATIONS

Long Weimin et. al. [CN110711972A] (machine translation) (Year: 2020).*

* cited by examiner

*Primary Examiner* — Sally A Merkling
*Assistant Examiner* — Nazmun Nahar Shams
(74) *Attorney, Agent, or Firm* — Tarolli, Sundheim, Covell &Tummino LLP

(57) ABSTRACT

A braze coating material with a nickel core and a coating, a preparation method thereof, and a braze coating method are provided. The braze coating material with a nickel core and a coating requires no binder and has strong adhesion ability, and includes the nickel core, a coating layer, a hardened layer, and a protective layer sequentially from inside to outside. The nickel core is metallic nickel having a surface subjected to a roughening treatment. The coating layer is a first brazing flux layer including hard particles, a first brazing flux, and a brazing filler metal powder. The hardened layer contains a second brazing flux and is covered with the protective layer mainly composed of a silicate.

20 Claims, 1 Drawing Sheet

(51) Int. Cl.
*B23K 35/36* (2006.01)
*B23K 35/40* (2006.01)

(52) U.S. Cl.
CPC ...... *B23K 35/3602* (2013.01); *B23K 35/3607* (2013.01); *B23K 35/404* (2013.01)

(58) Field of Classification Search
CPC .......................... B23K 35/404; B23K 35/0244; B23K 35/262; B23K 35/3606; B23K 35/40
USPC .......................................................... 148/24
See application file for complete search history.

BRAZE COATING MATERIAL WITH NICKEL CORE AND COATING AND PREPARATION METHOD AND BRAZE COATING METHOD THEREOF

CROSS-REFERENCE TO RELATED APPLICATIONS

The present disclosure claims the priority to the Chinese Patent Application No. 202210656011.X, entitled "Braze Coating Material with Nickel Core and Coating and Preparation Method and Braze coating method thereof", and filed with the China Patent Office on Jun. 10, 2022, the entire contents of which are incorporated herein by reference.

TECHNICAL FIELD

The present disclosure relates to the technical field of braze coating materials, particularly to a braze coating material with a nickel core and a coating, and a preparation method and a braze coating method thereof.

BACKGROUND ART

High-performance PDC drills, tools, molds, and wear-resistant parts are all required to have high wear resistance and corrosion resistance. If the part is made of an integrated wear-resistant alloy or corrosion-resistant material, not only the cost is high, but also the overall mechanical properties often cannot meet the requirements. A reasonable solution includes applying a layer of wear-resistant or corrosion-resistant metal or alloy to the surface of the part using a surface technology. For forming a wear-resistant layer, commonly used methods include physical vapor deposition (PVD) method, chemical vapor deposition (CVD) method, thermal spraying method, surfacing welding (overlay welding) method, and braze coating method. The physical vapor deposition method and the chemical vapor deposition method can only result in very thin coatings, which are relatively expensive and are greatly limited in use. The thermally sprayed coating is a mechanically interlocked coating which is poorly bonded with the substrate. The surfacing welding involves heating at a higher temperature, which easily causes thermal stress and deformation and leads to poor surface formability. The braze coating method involves making a brazed coating metallurgically bonded with the base material, wherein the bonding strength is much higher than the mechanical bonding in the thermal spraying; the braze coating involves heating at a lower temperature and thus causes less thermal stress and less change in properties of the base material, than the surfacing welding; and the brazed coating has a smooth surface and high construction accuracy, and can reach the required accuracy by being less processed.

The braze coating material consists of two parts, wherein one part is a common brazing filler alloy, which has a lower melting temperature, and is generally called a low melting point component; and the other part is a wear-resistant material, such as a hard alloy with a high melting point or diamond, which is generally called a high melting point component. In theory, any brazing filler material (solder, brazing material) can constitute the low melting point component of the braze coating material. However, as a wear-resistant layer, the brazing filler material itself is required to have certain hardness and not to be soft. Currently, nickel-based brazing filler materials are commonly used. The nickel-based brazing filler material is hard, brittle, and poor in processability, and can hardly be processed into a wire-shaped or strip-shaped brazing filler material. The traditional practice includes two approaches. In one approach, a nickel-based brazing filler material is firstly made into a powdered brazing filler material, and then is used together with hard alloy/diamond particles, binder, organic materials, and the like to prepare a braze coating material in a form of suspended slurry, which is applied or adhered onto a surface of a workpiece. In order to prevent the oxidation of the base material and the powdered brazing filler material and to facilitate wetting and spreading of the brazing filler material on the surfaces of the hard alloy/diamond particles and the base material, it is necessary to continuously add a brazing flux during the braze coating procedure, which results in low work efficiency and easily causes a large waste of the brazing flux and higher cost.

In another approach, a surface of a nickel core is coated, by press-coating, with a coating layer consisting of an organic binder, wear-resistant particles, a brazing flux, and a brazing filler metal powder. This approach results in a braze coating material with a nickel core and a coating, which has a double-layer structure. This braze coating material in a composite structure has high bonding strength of the coating, and overcomes the difficulty that the nickel-based brazing material can hardly be processed into wires or strips, and automatic production can be realized for the braze coating procedure. With the continuous update and iteration of technology, the quality requirements for the products are constantly improving. The braze coating material with a nickel core and a coating, which has a double-layer structure, contains an organic binder, the residue generated therefrom during use affects the quality of the braze coating. Additionally, the powdery metal particles exposed outside are easily oxidized and deteriorated during transportation and storage, which affects the quality of the braze coating. Therefore, it is urgent to develop a high-quality braze coating material with a nickel core and a coating, which does not contain an organic binder and is hardly oxidized.

In view of this, the present disclosure is proposed.

SUMMARY

It is a first object of the present disclosure to provide a braze coating material with a nickel core and a coating, which alleviates the technical problems of the residual organic binder and oxidation tendency existing in the braze coating material with a nickel core and a coating.

It is a second object of the present disclosure to provide a preparation method of the braze coating material with a nickel core and a coating, which has convenient operation and a high degree of automation.

It is a third object of the present disclosure to provide a braze coating method, which has low carbon residue and provides stable brazing quality in the braze coating procedure.

In order to solve the above-mentioned technical problems, the present disclosure adopts the following technical solutions.

According to an aspect of the present disclosure, the present disclosure provides a braze coating material with a nickel core and a coating, including the nickel core (i.e. the nickel inner core), a coating layer (i.e. the coating), a hardened layer, and a protective layer sequentially from inside to outside, wherein the nickel core is metallic nickel having a roughened (textured) surface;

the coating layer contains, in mass percentage, 15%-45% of hard particles, 8-12% of a first brazing flux, and a balance of a brazing filler metal powder; the brazing filler metal powder and the metallic nickel in the nickel core constitute a nickel-based brazing filler material; the hardened layer contains a second brazing flux; and the protective layer contains a silicate.

Preferably, the brazing filler metal powder is a powder of other elements remaining after removal of the Ni element from the nickel-based brazing filler material; and when a mass sum of the Ni element in the nickel core and the elements in the brazing filler metal powder is defined as a total mass, mass percentages of the Ni element and the elements in the brazing filler metal powder in the total mass are consistent with mass percentages of the elements in the nickel-based brazing filler material.

Preferably, the brazing filler metal powder has a particle size of 80 meshes to 120 meshes.

Preferably, the hard particles include one or more of WC, Cr3C2, TiC, B4C, WB, diamond, and c-BN hard particles.

Preferably, the hard particles have a particle size of 20 meshes to 60 meshes.

Preferably, the first brazing flux is a hard brazing flux.

Preferably, the hard brazing flux includes a boride, or alternatively the brazing flux includes a boride; or a boride and a modifier; the boride is borax and/or boric acid; and the modifier is a fluoride or chloride of an alkali metal or alkaline earth metal.

Preferably, the hard brazing flux includes, in mass percentage, 80%-90% of borax and 10%-20% of sodium fluoride.

Preferably, the second brazing flux is a reaction product of a fluoride of an alkali metal or alkaline earth metal and a boride.

Preferably, the boride is boric acid.

Preferably, the fluoride of an alkali metal or alkaline earth metal is potassium hydrogen fluoride.

Preferably, the second brazing flux consists of a reaction product of potassium hydrogen fluoride and boric acid in a molar ratio of 2:3.

Preferably, the protective layer consists of sodium silicate or potassium silicate.

Preferably, the braze coating material with a nickel core and a coating is strip-shaped or wire-shaped.

Preferably, the nickel core has a diameter of 0.5-7 mm.

Preferably, the coating layer has a thickness of 0.5-3 mm.

Preferably, the hardened layer has a thickness of 0.5-1 mm.

Preferably, the protective layer has a thickness of 0.2-0.5 mm.

According to another aspect of the present disclosure, the present disclosure also provides a preparation method of the braze coating material with a nickel core and a coating, the preparation method including: preparing a suspended slurry from the brazing filler metal powder, the hard particles, and the first brazing flux into according to proportions, and then press-coating a surface of the pure nickel core subjected to roughening treatment to obtain the coating layer; spraying the second brazing flux on a surface of the coating layer to obtain the hardened layer; and subsequently, spraying a silicate solution on a surface of the hardened layer to obtain the protective layer, and drying to obtain the braze coating material with a nickel core and a coating.

Preferably, a drying temperature is 120° C. to 160° C.

Preferably, the drying is tunnel drying.

According to still another aspect of the present disclosure, the present disclosure also provides a braze coating method including coating a surface of a substrate with the braze coating material with a nickel core and a coating.

The present disclosure has the following advantageous effects as compared to the prior art.

The present disclosure provides a braze coating material with a nickel core and a coating, which requires no binder and has strong adhesion ability. The braze coating material with a nickel core and a coating includes the nickel core, a coating layer, a hardened layer, and a protective layer sequentially from inside to outside. The braze coating material with a nickel core and a coating, in which the metallic nickel as a core and the brazing filler metal powder in the coating constitute the nickel-based brazing filler material, alleviates the problem of oxidation tendency caused by use of the powdered brazing filler material alone, and facilitates wetting and spreading of the brazing filler material on the surfaces of the hard particles and the base material. The coating layer further contains the first brazing flux and hard particles suitable for (matched with) the nickel-based brazing filler material. The first brazing flux has a main function of protecting the brazing filler material from being oxidized. The hardened layer contains a second brazing flux, which has a main function of forming a hard protective shell outside the coating layer, so that the coating layer is secured on the surface of the nickel core, thus achieving an effect of securing the coating layer without an organic binder. The hardened layer also has a function of protecting the brazing filler material. The silicate in the protective layer forms a protective shell on the surface of the hardened layer, which is advantageous for preventing the oxidation and deterioration of the brazing filler material components during transportation and storage. Also, the silicate does not form inclusions during brazing and thus does not affect the quality of the braze coating. The braze coating material with a nickel core and a coating has strong adhesion, is not likely to absorb moisture and be oxidized during transportation and storage, and also has the advantages of less coating loss, convenient storage, and stable welding performance.

The preparation method of the braze coating material with a nickel core and a coating provided by the present disclosure has the advantages of convenient operation and high degree of automation, and the prepared braze coating material can solve the problems of moisture absorption and oxidation tendency during transportation and storage.

The braze coating method provided by the present disclosure, in which the above-mentioned braze coating material with a nickel core and a coating is used as the braze coating material, has a low residual carbon content in the braze coating procedure and a stable welding quality.

BRIEF DESCRIPTION OF DRAWINGS

In order to clarify the specific embodiments of the present disclosure or the technical solutions in the prior art, the drawings to be used in the description of the specific embodiments or the prior art are briefly introduced as follows. It is apparent that the drawings in the following description are some embodiments of the present disclosure. For those of ordinary skill in the art, other drawings can also be obtained based on these drawings without creative efforts.

Figure 1:
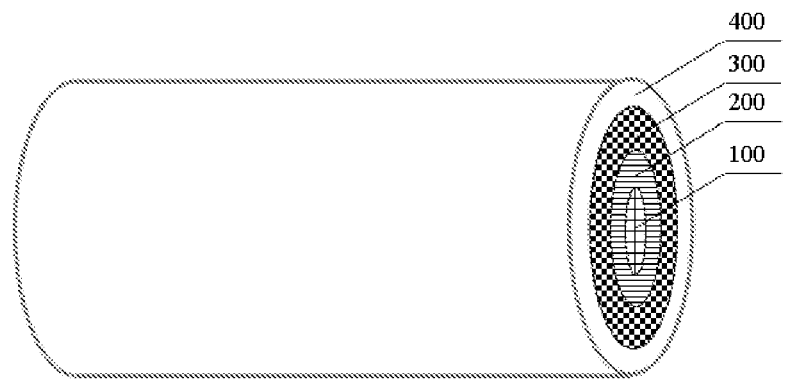
FIG. 1 is a structural schematic view of the braze coating material with a nickel core and a coating provided in Example 1 of the present disclosure.

Reference signs: 100—nickel core; 200—coating layer; 300—hardened layer; and 400—protective layer.

DETAILED DESCRIPTION OF THE EMBODIMENTS

The technical solutions of the present disclosure will be clearly and completely described below with reference to the examples. It is apparent that the described examples are part, but not all, of the examples of the present disclosure. All other examples obtained based on the examples of the present disclosure by those of ordinary skill in the art without creative efforts shall fall within the protection scope of the present disclosure.

According to an aspect of the present disclosure, the present disclosure provides a braze coating material with a nickel core and a coating, including a nickel core, a coating layer, a hardened layer, and a protective layer sequentially from inside to outside.

The nickel core is metallic nickel having a surface subjected to the roughening treatment, and the nickel core is coated with the coating layer. The coating layer is a first brazing flux layer, which includes, in mass percentage, 15%-45%, such as but not limited to 15%, 20%, 25%, 30%, 35%, 40%, or 45%, of hard particles; 8% to 12%, such as but not limited to 8%, 10%, or 12%, of a first brazing flux; and a balance of brazing filler metal powder.

In the braze coating material with a nickel core and a coating provided by the present disclosure, the metallic nickel in the nickel core and the brazing filler metal powder in the coating layer constitute a nickel-based brazing filler material, and the brazing filler metal powder is a powder of the other elements remaining after removal of the Ni element from the nickel-based brazing filler material. Preferably, when a mass sum of the Ni element in the nickel core and the elements in the brazing filler metal powder is defined as a total mass, mass percentages of the Ni element and the elements in the brazing filler metal powder in the total mass are consistent with mass percentages of the elements in the nickel-based brazing filler material. Specifically, taking BNi-2 (BNi85.4Cr7Si4.5B3.1 Fe3) nickel-based brazing filler material as an example, the brazing filler metal powder is a metal powder consisting of Cr, Si, B, and Fe; and the mass ratio of Ni in the nickel core and Cr, Si, B, and Fe in the brazing filler metal powder is 85.4:7:4.5:3.1:3, in mass percentage. Taking BNi76CrP nickel-based brazing filler material as an example, the brazing filler metal powder is a powder consisting Cr and P; and based on the total mass of Ni, Cr, and P, the mass percentage of Cr is 13-15%, the mass percentage of P is 9.7-10.5%, and the balance is Ni (refer to the national standard GT/T 10859-2008).

The type of nickel-based brazing filler material is not limited in the present disclosure. Any nickel-based brazing filler material acceptable in the art can be used to prepare the braze coating material with a nickel core and a coating. For example, the nickel-based brazing filler material may be, but not limited to, nickel-chromium-silicon-boron, nickel-chromium-tungsten-boron, nickel-chromium-silicon, nickel-silicon-boron, nickel-phosphorus, nickel-chromium-phosphorus, or nickel-manganese-silicone, and the specific examples may be, but not limited to, BNi-2, BNi-3, BNi74CrFeSiB, BNi81CrB, BNi82CrSiBFe, BNi78CrSiBCuMoNb, BNi63WCrFeSiB, BNi67WCrFeSiB, BNi71CrSi, BNi73CrSiB, BNi77CrSiBFe, BNi95SiB, BNi89P, BNi76CrP, BNi65CrP, BNi66MnSiCu, BNi82CrSiB, or the like. The brazing filler metal powder has a particle size of preferably 80 meshes to 120 meshes, such as but not limited to 80 meshes, 100 meshes, or 120 meshes, or is a mixture of powders with different particle sizes between any two points in the above range.

The hard particles are optionally conventional hard particles acceptable in the art, such as but not limited to, one or more of WC, Cr3C2, TiC, B4C, WB, diamond, and c-BN hard particles. The hard particles has a particle size of 20 meshes to 60 meshes, such as but not limited to, 20 meshes, meshes, 30 meshes, 35 meshes, 40 meshes, 45 meshes, 50 meshes, 55 meshes, or 60 meshes, or are a mixture of powders with different particle sizes between any two points in the above range.

The first brazing flux is a brazing flux matched with the nickel-based brazing filler material, and has a main function of protecting the brazing filler material from being oxidized. The brazing flux acceptable in the art can be selected as the first brazing flux according to the type of nickel-based brazing filler material, brazing application and temperature. In some optional embodiments, the brazing flux is selected from hard brazing fluxes, which optionally include a boride, or a boride and a modifier. Here, the boride mainly includes borax, boric acid, or a mixture of borax and boric acid; and the modifier, which is used to improve the properties of borides, may be selected from fluorides or chlorides of an alkali metal or an alkaline earth metal. The modifier can improve the wetting ability of borax and boric acid as the brazing fluxes, improve the ability to remove oxides, and reduce the melting temperature and activation temperature of the brazing fluxes. The fluoride or chloride of an alkali metal or an alkaline earth metal may be, for example, but not limited to, potassium fluoride, potassium hydrogen fluoride, calcium fluoride, cadmium fluoride, lithium chloride, potassium chloride, zinc chloride, ammonium chloride, or the like.

In some optional embodiments, the hard brazing flux consists of borax and sodium fluoride. Preferably, the mass percentage of borax is 80%-90%, such as but not limited to 80%, 82%, 85%, or 90%, and the mass percentage of sodium fluoride is 10%-20%, such as but not limited to 10%, 15%, or 20%.

The coating layer is coated with a hardened layer, which is a second brazing flux layer. The hardened layer is mainly composed of the second brazing flux, and can form a hard protective shell outside the coating layer, so that the coating layer is secured on the surface of the nickel core, thus achieving an effect of forming a braze coating material having a coating without an organic binder. The hardened layer also has a function of protecting the brazing filler material. The second brazing flux is preferably a reaction product of a fluoride of an alkali metal or alkaline earth metal and a boride, where the boride is preferably boric acid, and the fluoride is preferably potassium hydrogen fluoride.

In a preferred embodiment, the second brazing flux preferably consists of a reaction product of boric acid and potassium hydrogen fluoride, and boric acid and potassium hydrogen fluoride are reacted following a reaction scheme: $2KHF_2+3H_3BO_3=K_2[(OH)F_4B_3O_3]+5H_2O$ to form the hardened layer. Therefore, the molar ratio of potassium hydrogen fluoride and boric acid is preferably 2:3. The reaction product of boric acid and potassium hydrogen fluoride can form a tough hard shell, so as to secure the coating layer on the nickel core. Also, the reaction product of boric acid and potassium hydrogen fluoride has a property of not absorbing moisture, and when coated on the coating layer, can prevent the oxidation of the brazing filler metal powder, and avoid the moisture absorption of the brazing flux in the coating layer.

The hardened layer is also covered by a protective layer mainly formed of a silicate, where the silicate is preferably sodium silicate or potassium silicate. Sodium silicate and potassium silicate are both vitric substances and capable of forming a protective shell, which is advantageous to prevent the oxidation and deterioration of the brazing filler material components during transportation and storage; and additionally, because of their relatively high melting points, they can function as a brazing flux at high temperatures during brazing to prevent oxidation of the brazing filler material.

The braze coating material with a nickel core and a coating provided by the present disclosure is preferably strip-shaped or wire-shaped, and the preferred size of each part is as follows.

The nickel core has a diameter of preferably 0.5-7 mm, such as but not limited to 0.5 mm, 1 mm, 2 mm, 3 mm, 4 mm, 5 mm, 6 mm, or 7 mm.

The coating layer has a thickness of preferably 0.5-3 mm, such as but not limited to 0.5 mm, 1 mm, 1.5 mm, 2 mm, or 3 mm.

The hardened layer has a thickness of preferably 0.5-1 mm, such as but not limited to, 0.5 mm, 0.6 mm, 0.7 mm, 0.8 mm, 0.9 mm, or 1.0 mm.

The protective layer has a thickness of preferably 0.2-0.5 mm, such as but not limited to, 0.2 mm, 0.3 mm, 0.4 mm, or 0.5 mm.

In the braze coating material with a nickel core and a coating provided by the disclosure, metallic nickel in the core and the brazing filler metal powder in the coating layer constitute the nickel-based brazing filler material, which alleviates the problem of oxidation tendency caused by use of the powdered brazing filler material alone, and facilitates wetting and spreading of the brazing filler material on the surfaces of the hard particles and the base material. In the braze coating material with a nickel core and a coating, the coating layer is secured on the surface of the nickel core via the hard shell formed by the hardened layer, so that the coating layer can be adhered to the surface of the nickel core without an organic binder, leading to formation of a uniform double-layer brazing flux membrane. The protective layer contains a silicate, which can protect the metal powder from being oxidized. Also, the silicate does not form inclusions during brazing and thus does not affect the quality of the braze coating. The braze coating material with a nickel core and a coating has strong adhesion, is not likely to absorb moisture and be oxidized during transportation and storage, and has also the advantages of less coating loss, convenient storage, and stable welding performance.

According to another aspect of the present disclosure, the present disclosure also provides a preparation method of the braze coating material with a nickel core and a coating, the preparation method including: preparing a suspended slurry from the brazing filler metal powder, the hard particles, and the first brazing flux into according to proportions, and then press-coating a surface of the pure nickel core subjected to roughening treatment, to obtain the coating layer; spraying the second brazing flux on a surface of the coating layer to obtain the hardened layer; and subsequently, spraying a silicate solution on a surface of the hardened layer to obtain the protective layer, and drying to obtain the braze coating material with a nickel core and a coating. A drying temperature is preferably 120° C. to 160° C., such as but not limited to 120° C., 130° C., 140° C., 150° C., or 160° C., and a drying method is preferably tunnel drying.

The preparation method of the braze coating material with a nickel core and a coating provided by the present disclosure is convenient to operate and has a high degree of automation. The prepared braze coating material with a nickel core and a coating effectively alleviates the problems of moisture absorption and oxidation tendency during transportation and storage, and high carbon residue in the braze coating process, and improves the stability of welding quality.

In a preferred embodiment, the preparation method of the braze coating material with a nickel core and a coating is carried out according to the steps of:

Step 1: preparing a pure nickel wire or a pure nickel strip with a surface thereof subjected to a roughening treatment;

Step 2: weighing the brazing filler metal powder, the hard particles, and the first brazing flux according to a formula to prepare a suspended slurry for use;

Step 3: adding the suspended slurry prepared in Step 2 into a powder coating cylinder of a press-coating device for use;

Step 4: feeding the pure nickel wire or pure nickel strip obtained in Step 1 into the powder coating cylinder through a feeding mechanism, and applying the suspended slurry evenly on the surface of the pure nickel wire or pure nickel strip by the press-coating device to form the coating layer;

Step 5: feeding the nickel wire or nickel strip with the coating layer obtained in Step 4 into a powder spraying device with two nozzles, and spraying, on its surface, boric acid and potassium hydrogen fluoride powder concurrently according to the formula proportion, where boric acid and potassium hydrogen fluoride are reacted following the reaction scheme: $2KHF_2 + 3H_3BO_3 = K_2[(OH)F_4B_3O_3] + 5H_2O$ to form the hardened layer;

Step 6: spraying a layer of sodium silicate solution on the surface of the pure nickel wire or nickel strip with a hardened layer obtained in Step 5; and Step 7: feeding the pure nickel wire or nickel strip including the protective layer obtained in Step 6 into a tunnel drying oven for drying at a tunnel drying temperature of preferably 120° C. to 160° C., and feeding the dried product into a winding device to obtain the braze coating material with a nickel core and a coating.

According to still another aspect of the present disclosure, the present disclosure also provides a braze coating method, including coating a surface of a substrate with the braze coating material with a nickel core and a coating. The above-mentioned braze coating material with a nickel core and a coating is used as the surface coating material, the braze coating material with a nickel core and a coating is used as the braze coating material, and the residual carbon content in the braze coating procedure is low, and the welding quality is stable.

The technical solutions and technical effects of the present disclosure are further described below with reference to the preferred examples.

Example 1

Figure 2:
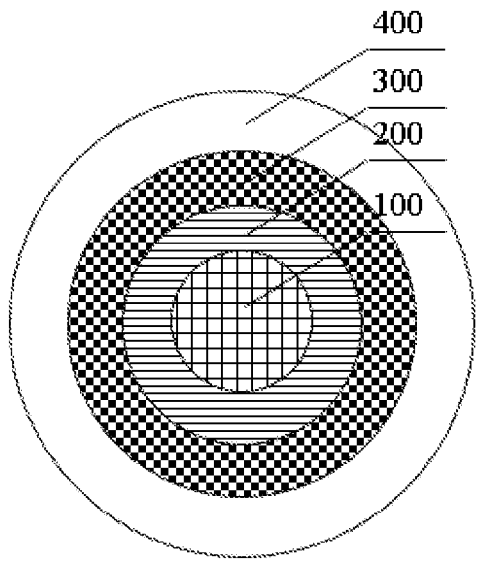
FIG. 2 is a schematic cross-sectional view of the braze coating material with a nickel core and a coating provided in Example 1 of the present disclosure.

This example provided a braze coating material with a nickel core and a coating, the structure of which is shown in FIG. 1 and FIG. 2. It consisted of a nickel core 100, a coating layer 200, a hardened layer 300, and a protective layer 400 sequentially from inside to outside. BNi-2 nickel-based brazing filler material (BNi85.4Cr7Si4.5B3.1 Fe3) was selected.

Nickel core 100: a pure nickel wire with a diameter of 1.0 mm and a length of 11 m was selected, and the nickel wire was weighed to be 70 g.

Coating layer 200: when the mass of the nickel wire was 70 g, the total mass of the nickel-based brazing filler material was 82 g. According to the mass percentages of the elements of the nickel-based brazing filler material, the amount of the other elements Cr, Si, B, and Fe in the nickel-based brazing filler material was calculated to be a total of 12 g, that is, the brazing filler metal powder had a total mass of 12 g and consisted of Cr, Si, B, and Fe in a mass ratio of 7:4.5:3.1:3.

If the mass fraction of WC was 15% and the mass fraction of the first brazing flux was 10%, then the mass fraction of the brazing filler metal powder in the entire coating layer 200 was 75%. The weight of the entire coating layer 200 could be calculated to be 1.6 g, so as to obtain by calculation that the mass of WC was 2.4 g and the mass of the first brazing flux was 1.6 g. The first brazing flux was a mixture of borax:sodium fluoride in a mass ratio of 90:10.

The above-mentioned brazing filler metal powder, WC particles, and the first brazing flux were prepared into a suspended slurry, and the suspended slurry was added in a powder coating cylinder of a press-coating device for use. The pure nickel wire with a diameter of 1.0 mm and a length of 11 m was fed into the powder coating cylinder through a feeding mechanism, and the suspended slurry was applied evenly on the surface of the pure nickel wire by the press-coating device to form the coating layer 200.

The prepared nickel wire with the coating layer 200 was fed into a powder spraying device with two nozzles, and boric acid and potassium hydrogen fluoride powder were concurrently sprayed on the surface of the nickel wire in a molar ratio of potassium hydrogen fluoride to boric acid of 2:3, with the thickness controlled to be 0.5 mm. A 0.2 mm thick layer of sodium silicate solution was sprayed, as a protective layer 400, on the surface of the prepared pure nickel wire including the hardened layer 300.

The prepared braze coating material with a coating was fed into a tunnel drying oven for drying, and the dried product was fed into a winding device to obtain the braze coating material with a nickel core and a coating.

The abrasive wear test of the product in this example was carried out by the MLG-130A dry rubber wheel abrasive wear tester using Q235 carbon steel as a base material. The size of the braze-coated product was 57 mm*25.5 mm*6 mm. The test load was 20N, the abrasive was 120 #corundum sand, the rotational speed of the rubber wheel was 100 r/min, the sand flow rate was 100 g/min, and the wear time was 15 min. The wear of the coating was expressed by weight loss, and the test result was 35 g. For a traditional braze coating material in the form of suspended slurry prepared using BNi-2 brazing filler metal powder, cast tungsten carbide, and the like in the same proportion, the test result was 45 g in the same braze coating process and abrasive wear test. The braze coating material with a nickel core and a coating provided in Example 1 had a wear resistance that is significantly higher than that of the traditional powdered braze coating material.

Example 2

This example provided a braze coating material with a nickel core and a coating, which is different from Example 1 in that the hard particles in the coating layer was 45% of diamond particles, the nickel-based brazing filler material was BNi76CrP, and when the mass of the nickel wire was 70 g, the total mass of the nickel-based brazing filler material was 92 g. According to the mass percentages of the elements of the nickel-based brazing filler material, the amount of the other elements Cr and P in the nickel-based brazing filler material was calculated to be a total of 22 g, that is, the brazing filler metal powder had a total mass of 22 g and consisted of Cr and P in a mass ratio of 14:10.

If the mass fraction of diamond was 45%, and the mass fraction of the first brazing flux was 10%, the mass fraction of the brazing filler metal powder accounted for 45% of the entire coating layer, so as to obtain by calculation that the weight of the entire coating layer was 48.9 g, the mass of WC was 22 g, and the mass of the first brazing flux was 4.89 g.

The other compositions and the preparation method were the same as in Example 1, and the test method were the same as in Example 1. The test result is described as follows.

The weight loss of the coating was 30 g. For a traditional braze coating material in the form of suspended slurry prepared using BNi76CrP brazing filler metal powder, cast tungsten carbide, and the like in the same proportion, the test result was 42 g in the same braze coating process and abrasive wear test.

Example 3

This example provided a braze coating material with a nickel core and a coating, which is different from Example 1 in that the hard particles in the coating layer was 25% of diamond particles, the nickel-based brazing filler material was BNi-2 (BNi85.4Cr7Si4.5B3.1 Fe3), and the nickel wire was weighed to be 70 g.

Coating layer: when the mass of the nickel wire was 70 g, the total mass of the nickel-based brazing filler material was 82 g. According to the mass percentages of the elements of the nickel-based brazing filler material, the amount of the other elements Cr, Si, B, and Fe in the nickel-based brazing filler material was calculated to be a total of 12 g, that is, the brazing filler metal powder had a total mass of 12 g and consisted of Cr, Si, B, and Fe in a mass ratio of 7:4.5:3.1:3.

If the mass fraction of diamond particles was 25% and the mass fraction of the first brazing flux was 10%, the mass fraction of the brazing filler metal powder accounted for 65% of the entire coating layer. Thus, the weight of the entire coating layer could be calculated to be 18.5 g. Therefore, it was obtained by calculation that the mass of diamond particles was 4.625 g and the mass of the first brazing flux was 1.85 g.

The other compositions and the preparation method were the same as in Example 1, and the test method were the same as in Example 1. The test result is described as follows.

The wear weight loss of the coating was 28 g. For a traditional braze coating material in the form of suspended slurry prepared using BNi-2 brazing filler metal powder, cast diamond, and the like in the same proportion, the test result was 40 g in the same braze coating process and abrasive wear test.

Finally, it should be noted that the above examples are merely used to illustrate the technical solutions of the present disclosure, but not to limit them. Although the present disclosure has been described in detail with reference to the foregoing examples, those of ordinary skill in the art should understand that the technical solutions described in the foregoing examples can be modified, or some or all of the technical features thereof can be equivalently replaced; and these modifications or replacements do not render the essence of the corresponding technical solutions deviate from the scope of the technical solutions of the examples of the present disclosure.

The invention claimed is:

1. A braze coating material with a nickel core and a coating layer, comprising the nickel core, the coating layer, a hardened layer, and a protective layer sequentially from inside to outside,
   wherein the nickel core is metallic nickel having a surface subjected to a roughening treatment;
   the coating layer comprises, in mass percentage, 15%-45% of hard particles, 8-12% of a first brazing flux, and a balance of a brazing filler metal powder, wherein the brazing filler metal powder and the metallic nickel in the nickel core constitute a nickel-based brazing filler material;
   the hardened layer contains a second brazing flux; and
   the protective layer contains a silicate.

2. The braze coating material according to claim 1, wherein the brazing filler metal powder is a powder of other elements remaining after removal of Ni element from the nickel-based brazing filler material; and when a mass sum of the Ni element in the nickel core and the elements in the brazing filler metal powder is defined as a total mass, mass percentages of the Ni element and the elements in the brazing filler metal powder in the total mass are consistent with mass percentages of the elements in the nickel-based brazing filler material.

3. The braze coating material according to claim 1, wherein the hard particles comprise one or more of WC, $Cr_3C_2$, TiC, $B_4C$, WB, diamond, and c-BN hard particles.

4. The braze coating material according to claim 1, wherein the first brazing flux is a hard brazing flux.

5. The braze coating material according to claim 1, wherein the second brazing flux is a reaction product of a fluoride of an alkali metal or alkaline earth metal and a boride.

6. The braze coating material according to claim 1, wherein the protective layer consists of sodium silicate or potassium silicate.

7. The braze coating material according to claim 1, wherein the braze coating material is strip-shaped or wire-shaped.

8. A preparation method of the braze coating material according to claim 1, comprising: preparing a suspended slurry from the brazing filler metal powder, the hard particles, and the first brazing flux according to proportions, and then press-coating a surface of the a nickel core subjected to a roughening treatment, to obtain the coating layer; spraying the second brazing flux on a surface of the coating layer to obtain the hardened layer; and subsequently, spraying a silicate solution on a surface of the hardened layer to obtain the protective layer, and drying to obtain the braze coating material with a nickel core and a coating layer.

9. The preparation method according to claim 8, wherein a drying temperature is 120° C. to 160° C.

10. A braze coating method comprising coating a surface of a substrate with the braze coating material according to claim 1.

11. The braze coating material according to claim 2, wherein the brazing filler metal powder has a particle size of 80 meshes to 120 meshes.

12. The braze coating material according to claim 3, wherein the hard particles have a particle size of 20 meshes to 60 meshes.

13. The braze coating material according to claim 4, wherein the hard brazing flux comprises a boride, or a boride and a modifier;
   the boride is borax and/or boric acid;
   the modifier is a fluoride or chloride of an alkali metal or alkaline earth metal.

14. The braze coating material according to claim 13, wherein the hard brazing flux comprises, in mass percentage, 80%-90% of borax and 10%-20% of sodium fluoride.

15. The braze coating material according to claim 5, wherein the boride is boric acid; and the fluoride of an alkali metal or alkaline earth metal is potassium hydrogen fluoride.

16. The braze coating material according to claim 15, wherein the second brazing flux consists of a reaction product of potassium hydrogen fluoride and boric acid in a molar ratio of 2:3.

17. The braze coating material according to claim 7, wherein the nickel core has a diameter of 0.5-7 mm.

18. The braze coating material according to claim 7, wherein the coating layer has a thickness of 0.5-3 mm.

19. The braze coating material according to claim 7, wherein the hardened layer has a thickness of 0.5-1 mm.

20. The braze coating material according to claim 7, wherein the protective layer has a thickness of 0.2-0.5 mm.

* * * * *